June 9, 1936.   S. M. ANDERSON   2,043,725
BEARING MOUNTING
Filed Sept. 7, 1934
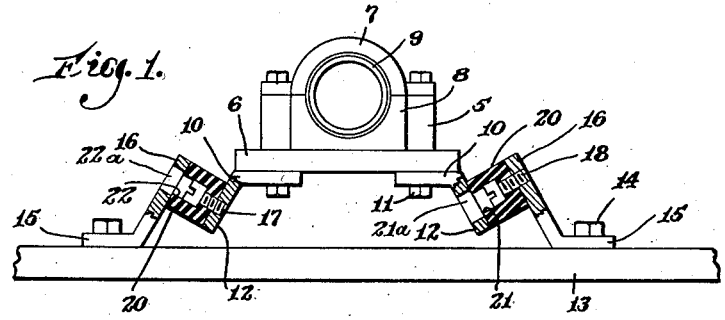
Inventor
Samuel M. Anderson
by Robert T. Palmer
Attorney Patented June 9, 1936

2,043,725

UNITED STATES PATENT OFFICE 2,043,725

BEARING MOUNTING

Samuel M. Anderson, Sharon, Mass., assignor to
B. F. Sturtevant Company, Inc., Boston, Mass.

Application September 7, 1934, Serial No. 743,049

2 Claims. (Cl. 308—26)

This invention relates to vibration-absorbing mountings for bearings, and relates more particularly to a vibration-absorbing mounting for use with the ball bearings of blowers, motors, and other equipment used in air conditioning systems.

In air conditioning apparatus, and particularly in the air conditioning apparatus installed in railway passenger cars, it is highly desirable that the apparatus operate as quietly as possible. In the ordinary air conditioning installation in a railway passenger car, the noises from the air conditioning equipment are excessive. Not only is there a pronounced noise due to the air movement, but due to the fact that the air conditioning equipment is usually made of sheet metal, any vibrations which originate in the rotary equipment, such for example as fans, driving motors, etc., are transmitted as noise to the passenger space, creating unpleasant sensations. In the ordinary railway passenger car, longitudinal distribution ducts are usually used, and these ducts are spaced a relatively short distance above the heads of the passengers with the result that any noise carried by the ducts is received substantially undiminished by the ears of the passengers.

While in the past it has been proposed to support motor and fan housings, etc., upon rubber or spring suspensions in order to absorb sound-producing vibrations and thus to eliminate noise, such mountings have not been satisfactory for supporting apparatus in the air conditioning systems of railway passenger cars. To take a typical example, a blower which is used for moving the air through an air conditioning unit and for discharging it into the passenger space is rotated at relatively high speed. Such blowers are mounted on ball bearings to insure economy and reliability of operation. The ball bearings, themselves, produce a pronounced noise, which, although not loud, is undesirable. Cushioning the bases of the blowers and motors having ball bearings, on the ordinary type rubber damping mounting, has not proved at all satisfactory. For example, in the ordinary fan or blower, the vibrations originating in the ball bearings are transmitted to the metal casing of the fan or blower, setting same into vibration.

According to a feature of this invention, a bearing is isolated, by a resilient vibration-absorbing mounting, from the mounting of the apparatus in which the bearing is used. The vibration-producing noises are thus absorbed adjacent their point of origin before they have the opportunity of setting up vibrations elsewhere.

According to another feature of this invention, a unique form of bearing mounting is provided in which the bearing is suspended by a resilient material, such as rubber, which is placed both under tension and shear.

According to another feature of this invention, the journal of the bearing is spaced from a base and is resiliently supported thereto; the journal of the bearing having a plurality of members extending towards the base; the base having a plurality of cooperating members extending towards the journal, with rubber or other suitable material attached to and attaching the respective pairs of members together.

An object of the invention is to provide a bearing support which does not transmit the noises generated in the bearing.

Another object of the invention is to provide a vibration-absorbing mounting for suspending a bearing.

Other objects of the invention will be apparent from the following description taken together with the drawing.

The invention will now be described with reference to the drawing, of which:

Fig. 1 is a side view of one embodiment of the invention showing a portion of a bearing support in section and a resilient mounting for the bearing;

Fig. 2 is a plan view of one of the resilient members shown by Fig. 1;

Fig. 3 is a side view of another way in which resilient vibration-absorbing members, according to this invention, may be attached;

Fig. 4 is a vector diagram showing the couple of forces acting upon differential elements of the bearing mountings of Figs. 1 and 3.

The bearing assembly shown by Fig. 1, comprises the bearing journal indicated generally by the numeral 5, which has the journal base 6, which is clamped to the upper outer ball race 7 and the lower ball race 8, between which the inner ball races 9 are contained in the usual manner. The journal base 6 has at one end (at the right hand side of the drawing looking at Fig. 1) the angle plate 10, which is bolted by the bolt 11 to the journal base 6, and which has the angle portion 12 extending downwardly and outwardly towards the main base 13. Bolted to the base 13 by means of the bolt 14 is the angle member 15, which corresponds to the angle member 10, above mentioned. This angle member 15 has an angle portion 16 extending upwardly towards the journal 5 of the bearing and preferably parallel to the angle portion 12 of the angle plate 10.

The journal base 6 has at its other end another angle plate assembly exactly similar to that described above, and corresponding parts have been given the same reference numerals as those just described above.

A resilient member 20 of rubber, or other suitable resilient material, separates the angle portions 12 and 16 from each other, and at the same time supports the angle portion 12 from the angle portion 16. Each member 20 contains two inner openings 18a through which bolts 18 extend to clamp the member 20 to the angle portion 16, and two outer openings 17a through which the bolts 17 extend to clamp the member 20 to the angle portion 12. The section through the member 20 shown at the left hand side (facing the drawing) of the journal base 6 in Fig. 1, is taken along the line 1—1 of Fig. 2, and the section through the member 20 shown at the right hand side of the journal base 6 in Fig. 1, is taken along the line 1'—1' of Fig. 2. The upper portion of the openings 17a are cut out to form the enlarged openings 22, into which the screw heads of the screws 17 extend, and the lower portions of the openings 18a are cut out to provide the enlarged openings 21, into which the screw heads of screws 18 extend. The angle portions 12 are provided with the openings 21a, through which the bolts 18 are inserted, and the angle portions 16 are provided with the openings 22a through which the bolts 17 are inserted.

The surfaces of the rubber members 20, which are in contact with the angle portions 12 and 16, are preferably roughened to provide considerable frictional contact. This assists in counteracting the shear component of the forces acting upon the mountings, while the bolts 17 and 18, the axes of which are parallel to the tension component, counteract same.

Referring now to Fig. 3, another embodiment of the invention will be described. In this embodiment of the invention, the resilient members, which in this case may be rubber, are preferably vulcanized. In this embodiment, the resilient members 20c and 20d respectively are vulcanized directly to the angle portions 12c and 12d attached to the journal base 6c, and are also vulcanized to the angle portions 16c and 16d, attached to the base 13c.

It is to be noted that with the arrangements illustrated by Figs. 1 and 3, the resilient mountings are placed under both tension and shear. The upper portion of one of the resilient mountings 20, and 20c is placed under tension, depending upon the direction of rotation of the shaft within the bearing, and the other upper portion is placed under shear. At the same time, the lower portion of the mounting, the upper portion of which is placed in tension, has its lower portion placed under shear, and the lower portion of the mounting, which has its upper portion placed under shear, is itself placed in tension.

Fig. 4 illustrates the couples of forces acting upon differential elements 20d of the two oppositely placed mounting members 20. The forces acting upon the mountings are resolved into tension and shear components, the shear vectors being parallel to the face of each portion while the tension vectors are at right angles thereto. The couples are seen to be equal and opposite, and they balance the torque of the rotating shaft with which the bearing mountings are used.

With the above described arrangements, a tough, relatively non-elastic, and a resulting long life rubber member, for example, may be used, yet, due to the fact that this resilient member is placed under both tension and shear across its cross section, considerable resiliency is provided. With this type of mounting, it has been found that the noise generated in ball bearings is completely absorbed, no bearing noise being transmitted to the passengers in a railway passenger car equipped with the apparatus using the invention. Another advantage is that the mountings have long life, may be easily replaced, and are easily available for inspection.

Whereas several embodiments of the invention have been described for the purpose of illustration, it should be understood that the invention should not be limited to the details described, since many modifications may be made by those skilled in the art without departing from the spirit of the invention.

What is claimed is:

1. A bearing assembly comprising a base, a bearing, a horizontal plate attached to the journal of said bearing, a first pair of spaced plates having downwardly extending portions, one attached to said horizontal plate on each side of the journal of said bearing, a second pair of plates having upwardly extending portions spaced a greater distance apart than the plates of said first pair, and resilient members in contact with the outer faces of the downwardly extending portions of the plates of said first pair and with the inner faces of the corresponding upwardly extending portions of the plates of said second pair, said downwardly and upwardly extending portions of said plates and said members being so arranged that said members are placed under tension and shear, said members contacting with substantial areas of said faces of said portions of said plates whereby substantial resistance to shear is provided.

2. A bearing assembly comprising a bearing, a journal for said bearing, a horizontal plate attached to said journal, a horizontal base, a first pair of spaced plates having downwardly and outwardly extending portions, attached to said horizontal plate, one on each side of said journal, a second pair of spaced plates attached to said base and having upwardly and inwardly extending portions, each extending parallel to and being spaced a small distance from and outside of a corresponding downwardly extending portion of a plate of said first pair, and resilient members in contact with the outer faces of the downwardly extending portions of the plates of said first pair and with the inner faces of the corresponding upwardly extending portions of the plates of said second pair, said downwardly and upwardly extending portions of said plates and said members being so arranged that said members are placed under tension and shear, said members contacting with substantial areas of said faces of said portions of said plates whereby substantial resistance to shear is provided.

SAMUEL M. ANDERSON.